(12) United States Patent
He

(10) Patent No.: US 8,855,354 B2
(45) Date of Patent: Oct. 7, 2014

(54) ELECTROACOUSTIC TRANSDUCER WITH WIRELESS CHARGING COIL

(71) Applicant: Jing He, Shenzhen (CN)

(72) Inventor: Jing He, Shenzhen (CN)

(73) Assignees: AAC Acoustic Technologies (Shenzhen) Co., Ltd., Shenzhen (CN); AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 13/975,715

(22) Filed: Aug. 26, 2013

(65) Prior Publication Data
US 2014/0056462 A1    Feb. 27, 2014

(30) Foreign Application Priority Data

Aug. 27, 2012  (CN) .............. 2012 2 0427668 U

(51) Int. Cl.
H04R 1/02   (2006.01)
H04R 3/00   (2006.01)

(52) U.S. Cl.
CPC ...................... H04R 3/00 (2013.01)
USPC ........................................ 381/395; 381/386

(58) Field of Classification Search
CPC .............. H04R 1/06; H04R 9/00; H04R 9/02; H04R 9/06
USPC .................... 381/386, 394, 396, 409
See application file for complete search history.

(56) References Cited

U.S. PATENT DOCUMENTS

2009/0052721 A1*  2/2009  Dabrowski .................... 381/386

* cited by examiner

*Primary Examiner* — Ahmad F Matar
*Assistant Examiner* — Katherine Faley
(74) *Attorney, Agent, or Firm* — IPro, Inc.; Na Xu

(57) ABSTRACT

An electro-acoustic transducer includes a frame; a cover covering the frame, a magnetic system assembled with the frame, a vibration system having a diaphragm and a driving coil assembled with the frame, conductive terminals assembled with the frame, and an wireless charging coil supported by the frame. The conductive terminals include a pair of first terminals connecting to the driving coil and a pair of second terminals connecting to the wireless charging coil. The present electro-acoustic can provide wireless charging function.

3 Claims, 6 Drawing Sheets

ELECTROACOUSTIC TRANSDUCER WITH WIRELESS CHARGING COIL

FIELD OF THE INVENTION

The present disclosure generally relates to the art of electro-acoustic transducers, more particularly to an electro-acoustic transducer comprising an wireless charging coil.

RELATED ART OF THE INVENTION

Wireless charging (also known as "inductive charging") uses an electromagnetic field to transfer energy between two objects. This is usually done with a charging station. Energy is sent through an inductive coupling to an electrical device, which can then use that energy to charge batteries or run the device. Wireless chargers typically use an induction coil to create an alternating electromagnetic field from within a charging base station, and a second induction coil in the portable device takes power from the electromagnetic field and converts it back into electrical current to charge the battery. The two induction coils in proximity combine to form an electrical transformer. Greater distances between sender and receiver coils can be achieved when the inductive charging system uses resonant inductive coupling.

As electronic products developing, wireless charging technology is more and more demanded.

Generally, an electro-acoustic transducer comprises only a pair of conductive terminals to conduct electricity between one or two coils and a PCB of the electro-acoustic transducer. This kind of electro-acoustic transducer cannot provide wireless charging function.

Accordingly, it is necessary to provide an improved transducer for solving the problems mentioned above.

DETAILED DESCRIPTION OF THE EXEMPLARY EMBODIMENT

Figure 1:
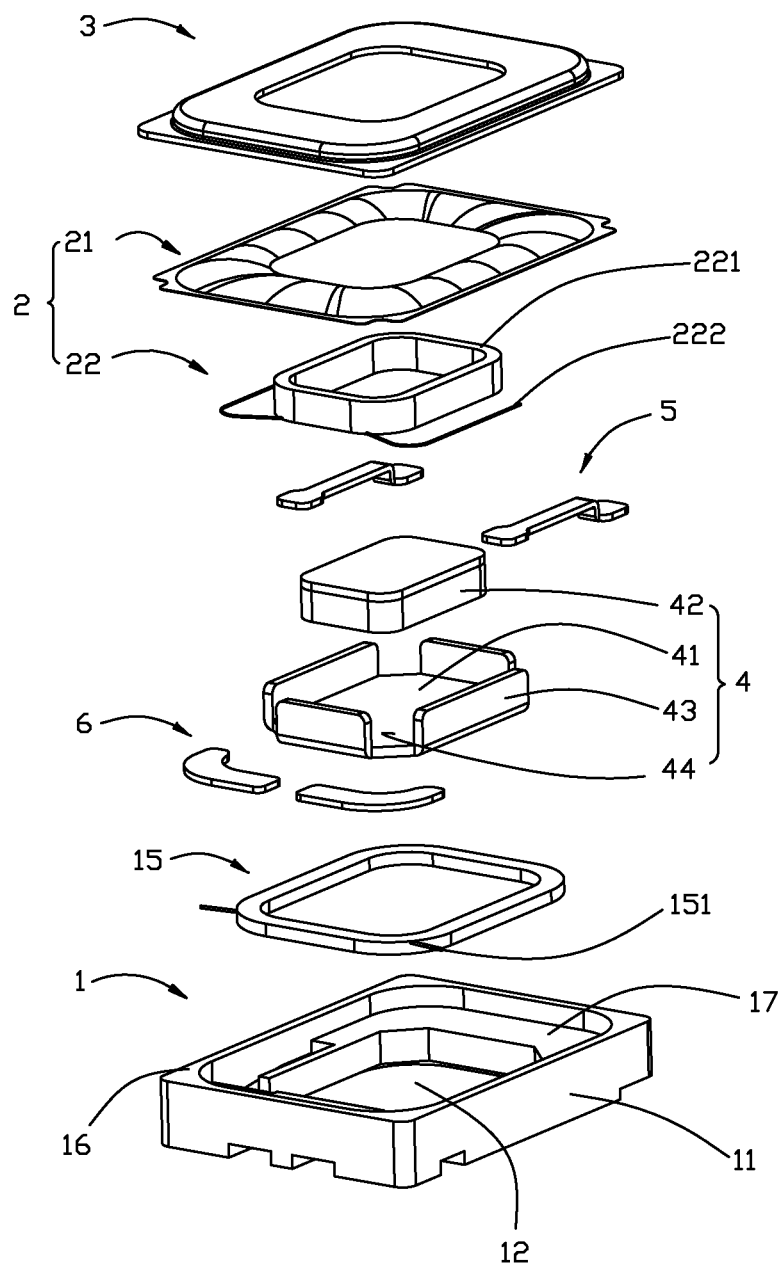
FIG. 1 is an exploded view of an electro-acoustic transducer in accordance with an exemplary embodiment of the present disclosure.

Reference will now be made to describe an exemplary embodiment of the present disclosure in detail.

Referring to FIGS. 1 to 6, an electro-acoustic transducer 100, in accordance with an exemplary embodiment of the present disclosure, includes a frame 1, a vibration system 2 mounted on the frame 1, a cover 3 covering the frame 1, a magnetic system 4 received in the frame 1, a first terminal 5 assembled on the frame 1, and a second terminal 6 assembled on the frame 1 and separated from the first terminal 5. The electro-acoustic transducer is used in electronic devices, such as cellular phones, PDAs (personal digital assistants), and so on.

The vibration system 2 comprises a diaphragm 21 and a driving coil 22 connected with the diaphragm 21 for driving the diaphragm 21 to vibrate. Optionally, the driving coil 22 may be connected to the diaphragm 21 via a medium which is directly connected with the diaphragm 21. In other words, the driving coil 22 may be connected to the diaphragm 21 directly or indirectly. Therefore, the term "connect" here means to connect something to another via a medium or to connect something to another directly without any medium. The driving coil 22 is wound by spiral of two or more turns of metal wire, such as copper wire. The driving coil 22 has a body 221 and a pair of first leading wires 222 drawn out from the body 221.

The magnetic system 4 comprises a base board 41, a first magnetic conduction member 42 disposed on a center portion of the base board 41, a second magnetic conduction member 43 disposed on a periphery portion of the base board 41 for forming a magnetic gap 45 together with the first magnetic conduction member 42. In this embodiment, four separated second magnetic conduction members 43 are provided to surround the first magnetic conduction member 42. Each two adjacent second magnetic conduction members 42 form air-leaking holes 44 therebetween. Air below the diaphragm enters the air-leaking holes 44 and finally leaks outside via the air-leaking holes 44, which balances the air pressure below the diaphragm. But, the amount of the second magnetic conduction members is variable corresponding to actual requirements In this embodiment, the first magnetic conduction member 42 is a permanent magnet and the second magnetic conduction member 43 is made of magnetic conduction materials for effectively conducting magnetic fluxes. Furthermore, the second magnetic conduction member 43 and the base board 41 are formed an integral unit. In an alternative embodiment, both the first magnetic conduction member and the second magnetic conduction members are permanent magnets. Or, the first magnetic conduction member is made of magnetic conduction materials for effectively conducting magnetic fluxes and the second magnetic conduction member is a permanent magnet. The first magnetic conduction member and the base board are formed an integral unit.

The electro-acoustic transducer 100 further comprises an wireless charging coil 15 fixed on the frame 1 and having a pair of second leading wires 151. The wireless charging coil receives power from the electromagnetic field created by an induction coil and converts the power back into electrical current to charge a battery of the electronic devices. So, the wireless charging coil is capable of charging the battery of the electronic devices.

Figure 2:
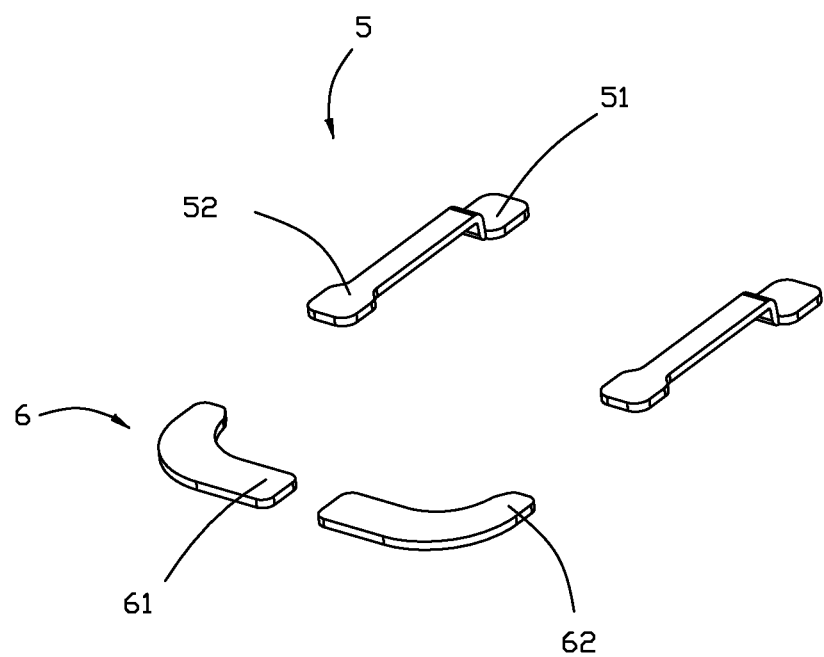
FIG. 2 is an enlarged view two pairs of conductive terminals of the electro-acoustic transducer in accordance with the exemplary embodiment of the present disclosure.
Figure 3:
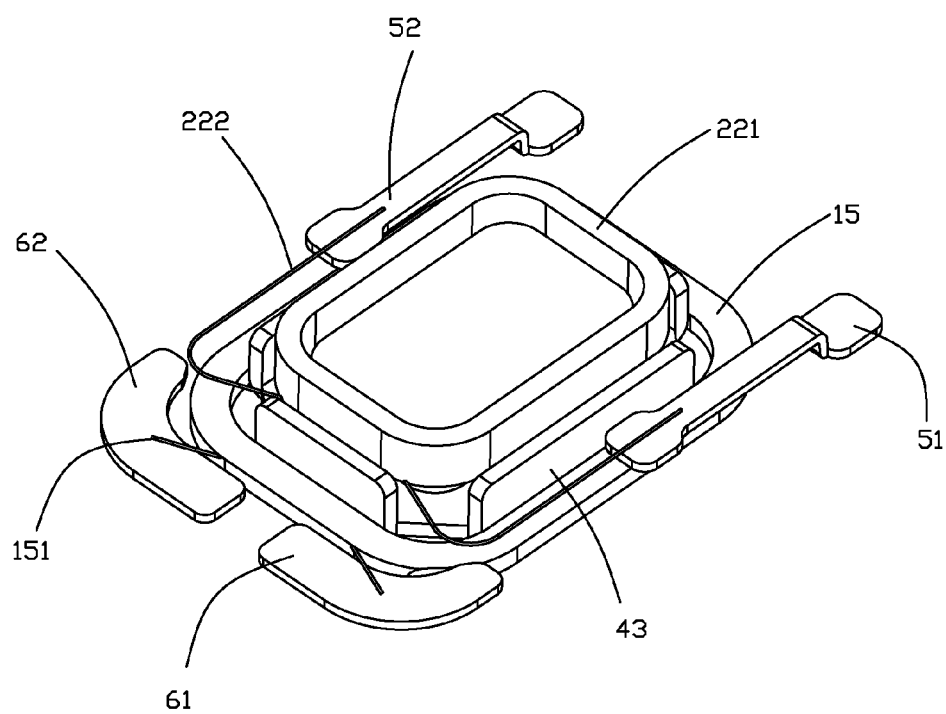
FIG. 3 is an assembly view of the electro-acoustic transducer in accordance with the exemplary embodiment of the present disclosure, a frame and a diaphragm thereof being removed.
Figure 4:
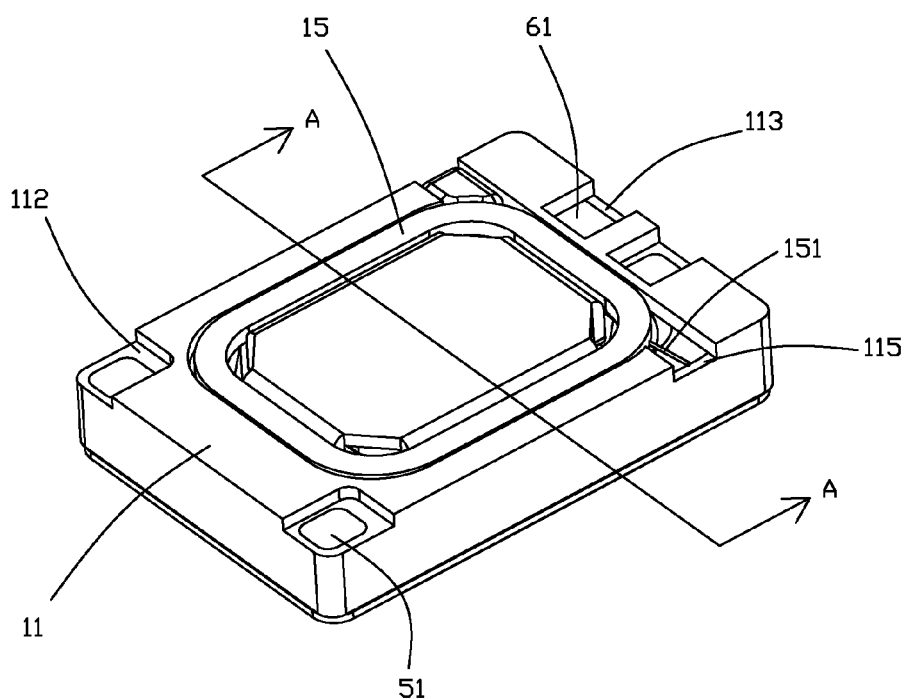
FIG. 4 is an illustrative isometric view of the electro-acoustic transducer in accordance with the exemplary embodiment of the present disclosure.
Figure 5:
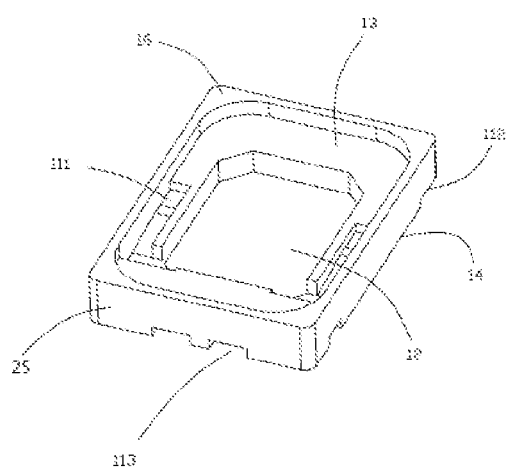
FIG. 5 is an illustrative isometric view of an frame of the electro-acoustic transducer in FIG. 1.
Figure 6:
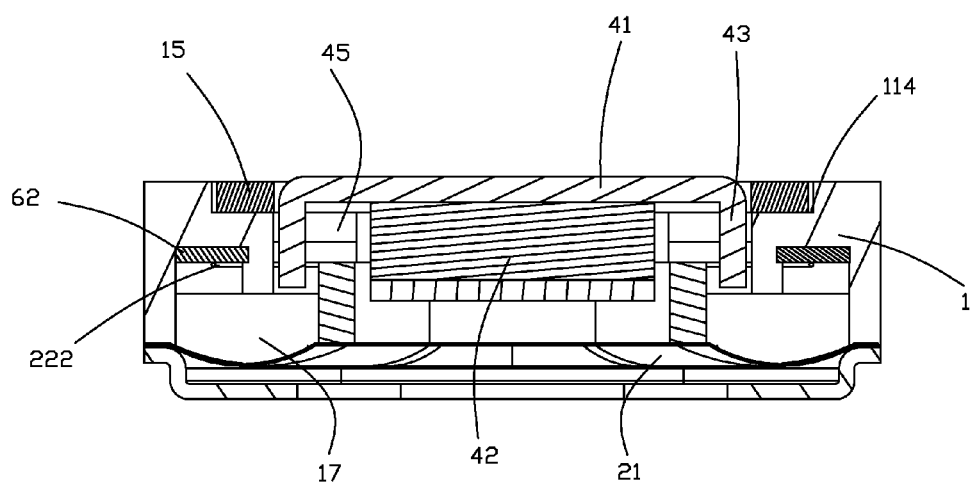
FIG. 6 is a cross-sectional view of the electro-acoustic transducer taken along line A-A of FIG. 4.

Referring to FIG. 2, the first terminals 5 comprises a first connecting part 51 fixed on the frame 1 and exposed from the frame 1 for transmitting electrical signals from an external circuit to the driving coil 22 and a first extending part 52 extending upwardly from the first connecting part 51 and fixed on the frame 1 for electrically connecting with the first leading wires 222. The second terminals 6 comprises a second connecting part 61 fixed on the frame 1 and exposed from the frame 1 for transmitting electrical signals from the external circuit to the wireless charging coil 15 and a second extending part 62 extending from the second connecting part 61 and fixed on the frame 1 for electrically connecting with the second leading wires 151. The second connecting part 61 is coplanar with the second extending part 62.

DETAILED DESCRIPTION OF THE EXEMPLARY EMBODIMENT

The frame 1 is approximately rectangular and has a body portion 11 and a receiving space 12 surrounded by the body portion 11. The body portion 11 has an upper surface 13 near the diaphragm 21, a lower surface 14 opposite to the upper surface 13, a sidewall 25 connecting the upper and lower surfaces 13, 14, a fixing portion 16 extending from the upper surface 13 away from the lower surface 14 for fixing the diaphragm 21 and providing a vibration space 17 to the diaphragm 21. The vibration space 17 is communicated with the receiving space 12. The body portion 11 further has a first receiving groove 111 extending from the upper surface 13 toward the lower surface 14, a first fixing groove 112 extending from the lower surface 14 toward the upper surface 13 and positioned on one end of the body portion 11 for fixing the first connecting part 51, a second fixing groove 113 extending from the lower surface 14 toward the upper surface 13 and positioned on the other end of the body portion 11 for fixing the second connecting part 62, a second receiving groove 115 extending from the lower surface 14 toward the upper surface 13 and positioned between the first and second fixing grooves 112, 113, and a fixing slot 114 extending from the lower surface 14 toward the upper surface 13 and communicated with the second receiving groove 115 for fixing the wireless charging coil 15. The fixing slot 114 is communicated with the receiving space 12 for surrounding the magnetic system 4 and engaging with the second magnetic conduction member 43 directly. The second receiving groove 115 is separated from the first and second fixing grooves 112, 113.

When assembled, at least a part of the first extending part 52 is received in the first receiving groove 111 and exposed from the upper surface 13 for electrically connected with the first leading wires 222 of the driving coil 22; the first connecting part 51 is fixed in the first fixing groove 112 and exposed from the lower surface 14; the second extending part 62 is received in the second receiving groove 115 and exposed from the lower surface 14 of the frame 1; and the second connecting part 61 is fixed in the second fixing groove 113 and exposed from the lower surface 14 of the frame 1. The wireless charging coil 15 is received in the fixing slot 114 and engaged with an outer surface of the second magnetic conduction member 43 directly. The first extending part 52 is near the diaphragm 21 than the first connecting part 51 and the second terminals 6.

The frame has a fixing slot for accommodating the wireless charging coil and the wireless charging coil is directly engaged with the magnetic system, thereby increasing the height of wireless charging coil. So, the electro-acoustic transducer has simple production, and reasonably utilizes the peripheral space of the electro-acoustic transducer, and can effectively reduce the volume of the electro-acoustic transducer. So, this arrangement provides the electro-acoustic transducer with a thin and small size.

While the present invention has been described with reference to specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An electro-acoustic transducer with wireless charging coil comprising: a frame; a magnetic system received in the frame; a vibration system mounted on the frame and having a diaphragm and a driving coil driving the diaphragm; a first terminal fixed on the frame for electrically connecting to the driving coil; a wireless charging coil fixed on the frame; and a second terminal fixed on the frame and separated from the first terminal for electrically connecting to the wireless charging coil, the frame having an upper surface near the diaphragm, a lower surface opposite to the upper surface, a sidewall connected with the upper and lower surface, and a fixing slot extending from the lower surface and toward the upper surface for receiving the wireless charging coil, wherein the frame further has a first receiving groove extending from the upper surface towards the lower surface and a first fixing groove extending from the lower surface toward the upper surface; the first terminal has a first connecting part accommodated in the first fixing groove and exposed from the lower surface and a first extending part extending upwardly towards the diaphragm and received in the first receiving groove.

2. The electro-acoustic transducer with wireless charging coil as described in claim 1, wherein the frame further has a second receiving groove extending from the lower surface towards the upper surface and a second fixing groove extending from the lower surface toward the upper surface and separated from the second receiving groove; the second terminal has a second connecting part accommodated in the second fixing groove and exposed from the lower surface and a second extending part extending from the second connecting part and received in the second receiving groove.

3. The electro-acoustic transducer with wireless charging coil as described in claim 2, where the first fixing groove is positioned on one end of the frame and the second fixing groove is positioned on another end of the frame.

\* \* \* \* \*